US009781494B1

(12) United States Patent
Barakat et al.

(10) Patent No.: US 9,781,494 B1
(45) Date of Patent: Oct. 3, 2017

(54) SYSTEMS AND METHODS FOR ACTIVITY MONITORING

(71) Applicant: Wells Fargo Bank, N.A., San Francisco, CA (US)

(72) Inventors: Wayne Barakat, Novato, CA (US); David Hatch, Pacifica, CA (US); Dominik Vltavsky, Belmont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 14/981,023

(22) Filed: Dec. 28, 2015

(51) Int. Cl.
    *H04Q 9/00* (2006.01)

(52) U.S. Cl.
    CPC .......... *H04Q 9/00* (2013.01); *H04Q 2209/40* (2013.01)

(58) Field of Classification Search
    CPC ... A61B 5/0022; A61B 5/1118; A61B 5/7275; A61B 5/0024; H04Q 2209/43; H04Q 9/00
    USPC ....................................... 340/870.07, 539.13
    See application file for complete search history.

(56) References Cited

U.S. PATENT DOCUMENTS

| | | | |
|---|---|---|---|
| 6,324,508 B1 | 11/2001 | Finney | |
| 6,675,130 B2 | 1/2004 | Kanevsky et al. | |
| 8,006,223 B2 | 8/2011 | Boulineau et al. | |
| 8,306,731 B2 * | 11/2012 | Waggaman, III | G06Q 10/06 340/438 |
| 8,364,440 B2 * | 1/2013 | Putkonen | G06Q 10/06 702/179 |
| 8,554,468 B1 | 10/2013 | Bullock | |
| 8,894,577 B2 * | 11/2014 | Reed | A61B 5/0002 340/539.12 |
| 2005/0280531 A1 * | 12/2005 | Fadem | A61B 5/0006 340/539.12 |
| 2006/0282191 A1 | 12/2006 | Gotfried | |
| 2010/0233663 A1 | 9/2010 | Pennington et al. | |
| 2013/0275187 A1 | 10/2013 | Patel | |
| 2013/0311226 A1 | 11/2013 | Dreselly | |
| 2014/0278638 A1 * | 9/2014 | Kreuzkamp | G06Q 10/06398 705/7.15 |
| 2015/0097700 A1 * | 4/2015 | Holthouse | H04Q 9/00 340/870.03 |
| 2015/0262467 A1 * | 9/2015 | Yuen | A61B 5/1118 340/870.07 |

* cited by examiner

*Primary Examiner* — Qutbuddin Ghulamali
(74) *Attorney, Agent, or Firm* — Foley & Lardner LLP (57) ABSTRACT

A activity monitoring computing system includes a network circuit exchanging information over a network and an evaluation circuit. The evaluation circuit receives, over the network via the network circuit, sensor data from a monitoring device indicative of physiological and movement characteristics of a monitored individual during performance of an assigned task. The evaluation circuit determines productivity information based on a comparison of the physiological and movement characteristics of the monitored individual and expected physiological and movement characteristics associated with the assigned task. The evaluation circuit transmits, over the network via the network circuit, the productivity information to at least one of a display device and the monitoring device.

20 Claims, 4 Drawing Sheets

SYSTEMS AND METHODS FOR ACTIVITY MONITORING

BACKGROUND

Monitoring devices are used for a variety of purposes, including monitoring behavior, activities, or other observable information. Monitoring devices may be located in a variety of places, including inside financial institutions, private residences, and work sites such as manufacturing facilities, constructions sites, and warehouses. Individuals in these areas can be monitored by another individual (e.g., security guard, etc.) for security or safety reasons but detailed information about activities of the individuals is typically not gathered. At the same time, most people carry some type of mobile handheld electronic device with a wireless internet connection, a variety of sensors including those with motion sensing capabilities and GPS capabilities. Furthermore, most work areas are often monitored with security cameras, motion sensors, or other monitoring devices. A person or organization may wish to acquire more detailed information about an individual or group of individuals to monitor them or to evaluate their performance based on certain criteria. Systems and methods for facilitating such evaluations to improve efficiency or performance of tasks would be desirable.

SUMMARY

One exemplary embodiment relates to a activity monitoring computing system. The activity monitoring computing system includes a network circuit and an evaluation circuit. The network circuit enables the activity monitoring computing system to exchange information over a network with a monitoring device. The evaluation circuit is configured to receive, over the network via the network circuit, sensor data from the monitoring device indicative of physiological and movement characteristics of a monitored individual during performance of an assigned task. The evaluation circuit is further configured to determine productivity information based on a comparison of the physiological and movement characteristics of the monitored individual and expected physiological and movement characteristics associated with the assigned task. The evaluation circuit is further configured to transmit, over the network via the network circuit, the productivity information to at least one of a display device and the monitoring device.

Another exemplary embodiment relates to a method of evaluating a performance of a plurality of monitored individuals by a activity monitoring computing system. The method includes receiving, by an evaluation circuit over a network via a network circuit, sensor data from a plurality of monitoring devices indicative of physiological and movement characteristics of a plurality of monitored individuals each performing an assigned task. The method further includes determining, by the evaluation circuit, for each of the monitored individuals, productivity information based on a comparison of the physiological and movement characteristics of the monitored individual and expected physiological and movement characteristics associated with the task assigned to the monitored individual. The method further includes transmitting, by the evaluation circuit over the network via the network circuit, the productivity information to at least one of a display device and at least one of the monitoring devices.

A further exemplary embodiment relates to non-transitory computer readable media having computer-executable instructions embodied therein that, when executed by an evaluation circuit of a activity monitoring computing system, causes the activity monitoring computing system to perform operations to evaluate a performance of a plurality of monitored individuals. The operations include receiving, over a network via a network circuit, sensor data from a plurality of monitoring devices indicative of physiological and movement characteristics of a plurality of monitored individuals each performing an assigned task. The operations further include determining for each of the monitored individuals, productivity information based on a comparison of the physiological and movement characteristics of the monitored individual and expected physiological and movement characteristics associated with the task assigned to the monitored individual. The operations further include transmitting the productivity information to at least one of a display device and at least one of the monitoring devices over the network via the network circuit.

DETAILED DESCRIPTION

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting. For example, the embodiments of systems and methods of activity and productivity monitoring discussed herein may be relevant to any of a variety of circumstances where monitoring productivity of an individual or group of individuals may be useful.

Embodiments of systems and methods of activity and productivity monitoring using a activity monitoring computing system are discussed below. The activity monitoring computing system receives sensor data from monitoring devices that monitor individuals performing assigned tasks. The monitoring devices may be worn by the monitored individuals or positioned around an area where the tasks are to be performed. The sensor data is indicative of performance characteristics of the monitored individual and typically includes physiological and movement characteristics. For example, the physiological characteristics may include the monitored individual's breathing rate, pulse, body temperature, perspiration rate, and the like. The movement characteristics may include movements made by the monitored individual, including location information, movement patterns about an area, areas visited, rate of movement, and the like. The activity monitoring computing system determines productivity information for the monitored individual based on a comparison of the monitored individual's physiological and movement characteristics and expected physiological and movement characteristics associated with the assigned task. As such, a plurality of individuals may be monitored and evaluated based on objective measures of their performance in carrying out an assigned task.

The embodiments and implementations of the systems and methods disclosed herein improve current monitoring systems and computing systems for monitoring and evaluating the performance of individuals by determining activity information for multiple individuals performing assigned tasks in a work area. These systems, methods, and computer implementations improve monitoring capabilities and personnel management systems by providing faster results and alerts, more accurate and objective evaluations, and greater workplace safety, thereby providing improvements to the fields of monitoring individuals, security systems, and information management. As such, the systems, methods, and computer implementations disclosed herein improve the functioning of monitoring and personnel management computing systems by providing functionalities that are novel and non-obvious improvement over current systems.

Figure 1:
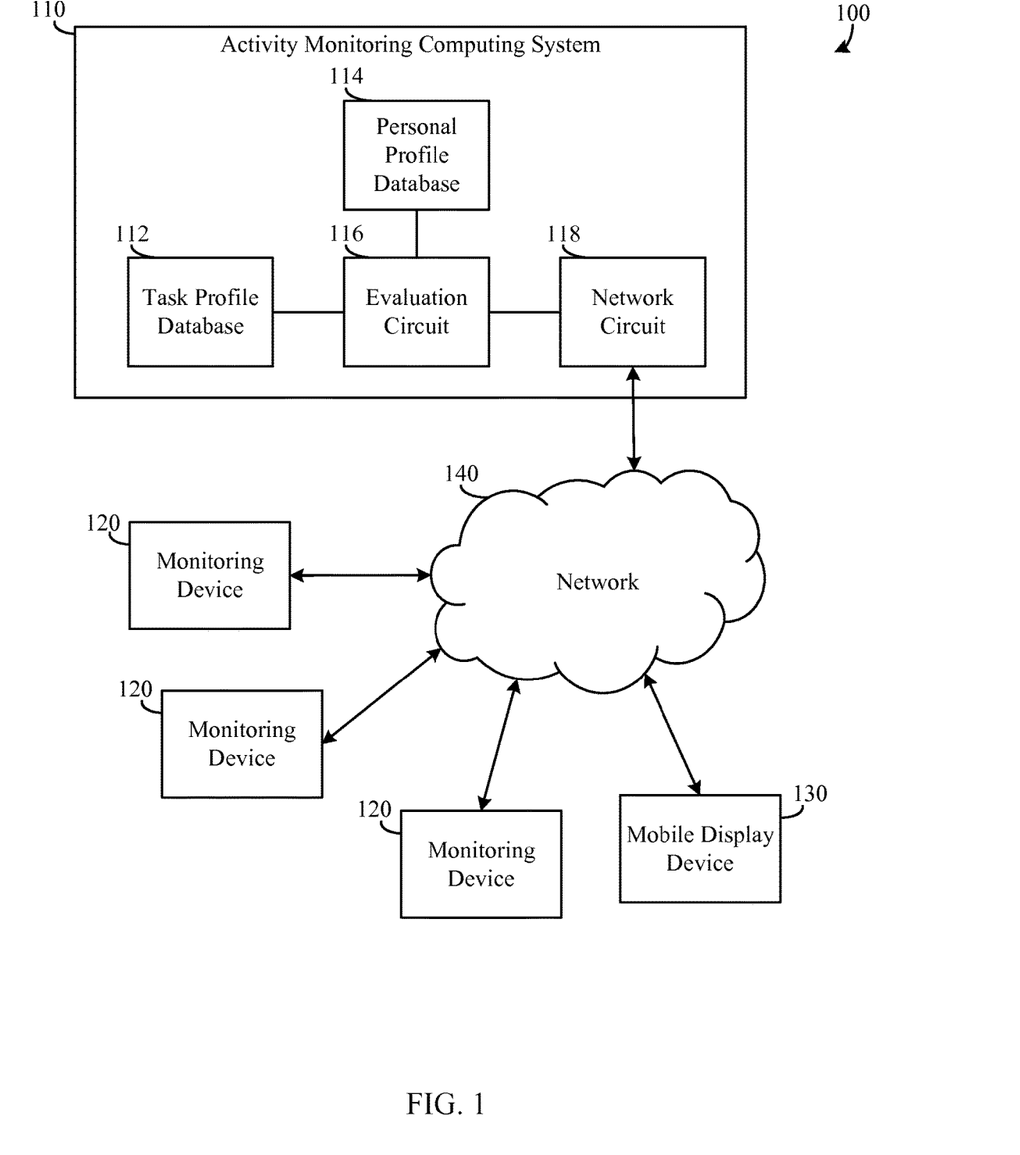
FIG. 1 is a block diagram illustrating an activity monitoring system, according to an example embodiment.

Referring to FIG. 1, a block diagram illustrating an activity monitoring system 100 is shown according to an example embodiment. The activity monitoring system 100 includes a activity monitoring computing system 110, a plurality of monitoring devices 120, and a mobile display device 130. Various components of the activity monitoring system 100 may be configured to communicate with each other over a network 140. The network 140 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments, the network 140 includes the internet.

The activity monitoring computing system 110 is a computing system capable of receiving information from a plurality of sources over the network 140 and storing, comparing, and analyzing information to evaluate individuals performing a task. The activity monitoring computing system 110 may include a task profile database 112, a personal profile database 114, an evaluation circuit 116, and an network circuit 118 enabling the activity monitoring computing system 110 to exchange data over the network 140.

The task profile database 112 allows the activity monitoring computing system 110 to retrievably store task information relating to various tasks performed by individuals, and may include non-transient data storage mediums (e.g., local disc or flash-based hard drives, local network servers, and the like) or remote data storage facilities (e.g., cloud servers). The task profile database 112 stores task information for a plurality of tasks previously completed but may also store task information for tasks that have not yet been completed. For example, the task profile database 112 may store task information regarding tasks that may or may not be completed in the future, or tasks that are scheduled to be completed. The task information is indicative of characteristics of each stored task. For example, the task information may include a type of task, a description of work completed, where the task was performed (e.g., a work site, a particular building, a city, a time zone, a country, etc.), identifying information of a person that performed the task, a value of the task to an employer (e.g., a "high priority" project, one-million-dollars, etc.), a number of hours needed to complete the task, how much effort was expended in completing the task, and environmental factors during performance of the task. For example, environmental factors may include information relating to weather conditions such as temperature (e.g., a high temperature, a low temperature, an average temperature), humidity, wind conditions, precipitation (e.g., precipitation type, amount, rate), sunlight, or other environmental events and conditions (e.g., thunderstorms, flooding, etc.).

In some embodiments, the task profile database 112 stores a work site plan such as a map or blueprint of an area where a task or set of tasks is to be performed. The work site plan may include performance guidelines and proposed timelines for various stages of the product or project to be completed. In some embodiments, the task profile database 112 is configured to associate multiple work site plans with one another based on common characteristics shared between two or more work site plans. For example, the task profile database 112 may associate a first work site plan performed in a distribution warehouse with a second work site plan performed in the same distribution warehouse because both work site plans were performed in the same work area. In some embodiments, the task profile database 112 may be configured to communicate with the personal profile database 114. For example, the task profile database 112 may associate work site plans with specific individuals or information associated with specific individuals. For example, the task profile database 112 may be configured to communicate with the personal profile database 114 to associate information relating to a specific individual with a work site plan if the specific individual performed a component task of the work site plan or is scheduled to perform a component task of the work site plan.

The personal profile database 114 allows the activity monitoring computing system 110 to retrievably store information relating to various individuals, and may include non-transient data storage mediums (e.g., local disc or flash-based hard drives, local network servers, and the like) or remote data storage facilities (e.g., cloud servers). The personal profile database 114 may store personal information (e.g., names, addresses, phone numbers, etc.), identification information (e.g., driver's license numbers, standard biometric data, etc.), and occupation or skill related information (e.g., work history, certifications, training program completed, etc.). The personal profile database 114 includes information relating to a plurality of individuals who may be selected by the evaluation circuit 116 or a supervisor to perform a component task of a work plan (e.g., employees, contractors, individuals available for work that are not yet employed, etc.). The personal profile database 114 may store any information acquired from a monitoring device 120 associated with an individual performing a component task of a work plan, including physiological and movement characteristics of the individual when performing the task. In some embodiments, the personal profile database 114 is configured to communicate with the task profile database 112. For example, the personal profile database 114 may associate specific individuals or information associated with specific individuals with work site plans stored in the task profile database 112. For example, the personal profile database 114 may be configured to communicate with the task profile database 112 to associate information relating to a work site plan with a specific individual if the specific individual performed a component task of the work site plan or is scheduled to perform a component task of the work site plan.

The evaluation circuit 116 enables the activity monitoring computing system 110 to monitor a plurality of individuals in a work area and to evaluate their performance to improve productivity and efficiency. The evaluation circuit 116 is configured to receive, over the network 140 via the network circuit 110, a variety of data and information from the monitoring device 120 and mobile display device 130. In one embodiment, the evaluation circuit 116 is configured to receive a work plan including parameters of a project to be completed. For example, the parameters of the project may include a map or a blueprint of a work site, an allotted time to complete the project, an amount of money or a budget for completing the project, a number of individuals required to complete the project, certain requirements or certifications that the individuals should or must possession (e.g., due to a skill level needed or preferred, or due to legal requirements), areas of the work site that individuals possessing a certain characteristics may enter, areas of the work site that individuals possessing or not possessing a certain characteristic may not enter, and so on. In some embodiments, the evaluation circuit 116 is configured to determine a set of component tasks of the project to be completed based on the parameters and the task information and to assign each component task of the set of component tasks to an individual based on a characteristic of the individual and a parameter of the project to be completed.

The evaluation circuit 116 is configured to receive, over the network 140 via the network circuit 110, sensor data from the monitoring device 120. In some embodiments, the sensor data is indicative of physiological and movement characteristics of a monitored individual during performance of an assigned task. The physiological characteristics can be any type of monitored mechanical, physical, and biochemical functions of an individual or the individual's organs. For example, in some embodiments, the physiological characteristics include at least one of a voice level, a voice pitch, a stress level, a pulse, a breathing rate, a perspiration rate, a blood pressure, and a body temperature of the monitored individual during performance of the assigned task. In some embodiments, the movement characteristics include at least one of a body motion direction, a body motion speed, a movement within an area associated with the work plan, and a location of the monitored individual during performance of the assigned task. For example, when used to monitor individuals performing tasks at a construction site, the movement characteristics may include a number of hammer swings that the monitored individual performs to build a wall section, how long it took the individual to perform each hammer swing, a power or force behind each hammer swing, a rate of hammer swings per second, and so on.

The evaluation circuit 116 may be configured to monitor an individual in a work site to ensure that the individual is complying with a parameter of the work plan, a safety regulation, or a law or ordinance. The evaluation circuit 116 may be configured to determine an individual's location or physical characteristics to determine whether the individual is complying with safety regulations. For example, the evaluation circuit 116 may determine that an individual is working too quickly and therefore is not being safe based on how quickly the individual moves from a first location to a second location within the work site, a breathing rate, or a pulse of the individual. The evaluation circuit 116 may determine that a particular individual is working at too great a pace and is therefore putting themselves at a higher risk of injury (e.g., due to falling, a heart attack, sunstroke, etc.) based on a monitored physiological characteristic of the individual such as the individual's blood pressure or body temperature. In some embodiments, the evaluation circuit 116 may generate an alert based on a health condition or status of the monitored individual. For example, the evaluation circuit 116 may determine, based on physiological characteristics of a particular individual, that the individual's blood pressure has dropped below a predetermined threshold and therefore the individual is at a high risk of passing out or fainting or is beginning to pass out or faint, and generate an alert that may be delivered to the monitoring device 120 to notify or warn the individual that they must change their behavior to avoid fainting. The evaluation circuit 116 may determine if the individual has already passed out or fainted and generate and deliver an alert to the mobile display device 130 to notify or warn a supervisor, colleague, or security guard of the monitored individual's current state. For example, the evaluation circuit 116 may be configured to transmit an alert to a device (e.g., the monitoring device 120), such as a wearable smart watch or other computing device, associated with the individual that causes the device to vibrate or generate an audible alert. In another example, the evaluation circuit 116 determines that a particular monitored individual is moving above a threshold level and transmits an alert to a computing device associated with the particular monitored individual that causes the computing device to alert the individual that they should move slower (e.g., take fewer steps per second, move from a first location to a second location longer than a certain amount of time, reduce their heartrate to below a threshold value, etc.). In some embodiments, the evaluation circuit 116 may determine how productive an individual is based on the monitored physiological and movement characteristics. For example, the evaluation circuit 116 may determine that an individual is not productive because a number of steps the individual takes per minute is below a threshold number of steps per minute value.

The evaluation circuit 116 is configured to determine expected physiological and movement characteristics for assigned tasks based on comparing the assigned task and task information stored in the task profile database 112. In some embodiments, the evaluation circuit 116 is configured to determine expected physiological and movement characteristics for the assigned task based on a profile associated with the monitored individual sored in the personal profile database 114. In some embodiments, the profile of the monitored individual includes data indicative of at least one of identification information, role or job title, a list of capabilities or certifications, medical information, and physical capabilities of the monitored individual. For example, physical capabilities of the monitored individual may indicate the individual's strength (e.g., an ability to lift, how much weight they can lift, etc.), endurance (e.g., based on steps taken or distance walked when performing a previous task) average pace of walking, average pace of walking when carrying an item, height, weight, body mass index, any known disabilities, and so on. For example, the evaluation circuit 116 may determine that a first individual is expected to take three trips back and forth between a storage facility and a project location to complete an assigned task based on physical capabilities of the first individual indicating the individual can only carry thirty-pound loads whereas the evaluation circuit 116 may determine that a second individual is expected to take only two trips to complete the same task based on physical capabilities of the second individual indicating the individual can carry up to fifty-pound loads. The evaluation circuit 116 may assign certain tasks to particular individuals based on determining which individuals are capable of performing the task or expected to perform the tasks most efficiently.

The evaluation circuit 116 is also configured to determine productivity information based on a comparison of the physiological and movement characteristics of the monitored individual and expected physiological and movement characteristics associated with the assigned task. For example, the evaluation circuit 116 may compare an actual number of steps taken by an individual in performing a task to a calculated expected number of steps required based on an actual number of steps another individual took in performing a similar task (e.g., a task with the same end result such as finishing construction of a wall, filing a certain number of paper documents in a filing system, locating and packing a particular number and type of items in a box for shipping, etc.) under similar circumstances (e.g., performed in the same work area, inside a similar building, based on a calculated shortest distance between points the individual needs to visit to complete a task, etc.). The evaluation circuit 116 may identify inefficiencies based on comparing the actual movement characteristics of the individual when performing the task with expected or forecasted movement characteristics. In some embodiments, the evaluation circuit 116 may generate a suggested route for an individual to take to ensure the individual moves in the most optimal way considering the layout of the work site and environmental conditions. For example, the evaluation circuit 116 may generate a map for an individual to follow when moving about a construction site due to a new wall being finished and a flood hazard forming due to rainfall.

The evaluation circuit 116 is also configured to forecast trends and generate reports based on the performance of individuals in carrying out assigned tasks. In some embodiments, the evaluation circuit 116 generates a safety report, an accident report, an efficiency report, or a productivity report based on an event, such as completion of a work plan, completion of a component task of a work plan, or an injury occurring. For example, a safety report generated by the evaluation circuit 116 may indicate that a particular individual was carrying a fifty-pound box prior to an accident occurring and suggest that the individual limit themselves to carrying lighter loads in the future.

The evaluation circuit 116 may determine which individual is expected to perform a task more efficiently or productively based on information stored in the task profile database 112 and the personal profile database 114. For example, the evaluation circuit 116 may base efficiency and productivity determinations on an amount of time an individual uses to complete a task, a number of steps an individual takes, a total distance moved by an individual during performing a task, and so on. In some embodiments, a health score may be calculated based on an amount of physical strain experienced by an individual performing a task and determined based on a physiological characteristic, such as a pulse rate, blood pressure, or body temperature of the individual when performing the task. For example, the evaluation circuit 116 may determine different expected physiological and movement characteristics for different individuals for the same or similar task based on the information stored in each individual's profile in the personal profile database 114.

The evaluation circuit 116 is configured to transmit, over the network 140 via the network circuit 110, the productivity information to at least one of a display device 130 and the monitoring device 120. In some embodiments, the evaluation circuit 116 transmits an alert to an individual via the monitoring device 120 over the network 140 via the network circuit 118 based on the individual entering an area they are not authorized to enter. The performance alert may be at least one of an audio, visual, or haptic alert. For example, the evaluation circuit 116 may send an alert to an individual that causes a monitoring device 120 associated with the individual to vibrate based on the individual entering an area having a security requirement that the individual does not possess or based on the individual entering a hardhat area while not wearing a hard hat. Alerts may be based on the evaluation circuit 116 determining that an individual is carrying too heavy of a load (e.g., based a characteristic associated with the individual in the personal profile database 114), has been sitting for too long of a time period without standing up, is walking at a pace above a predetermined threshold pace, etc.

In some embodiments, the evaluation circuit 116 is configured to transmit an alert providing a corrective action. For example, the evaluation circuit 116 may transmit an alert indicating that an individual entering a hardhat area without wearing a hardhat should leave the area and retrieve a hardhat before returning to the area. The evaluation circuit 116 may provide alerts with other corrective actions, such as notifying an individual that they took a wrong turn or that they are not in a secure or safe area. In some embodiments, the monitoring device 120 may be a piece of equipment and the location of the piece of equipment may be monitored to determine if the piece of equipment is being appropriately utilized (e.g., that hardhats are being used by workers performing certain tasks or performing tasks in certain areas). For example, the monitoring device 120 may include a pair of safety glasses and the evaluation circuit 116 may determine whether a user assigned a cutting or welding task is wearing the safety glasses when performing the cutting or welding task based on the location of the safety glasses or based on the safety glasses sensing skin contact with the individual (e.g., the skin contact indicating that the safety glasses are being worn over the individual's eyes rather than tucked in their pocket).

In some embodiments, the evaluation circuit 116 is configured to provide feedback to the monitoring devices 120 in real-time. The feedback provided to the monitoring device 120 may be indicative of actions performed by the monitored individual associated with the monitoring device 120 and the monitored individual's productivity information. For example, the feedback may include information indicative of the physiological and movement characteristics of the monitored individual, including the monitored individual's current heart rate, current pace (e.g., based on steps taken per minute), how heavy of a load the monitored individual is currently carrying, a current projected route the monitored individual is taking, and so on. The feedback may further include suggested changes for the monitored individual to make to improve their performance of a task and/or to improve their productivity based on their current physiological and movement characteristics. For example, the real-time feedback provided to the monitoring device 120 may indicate a faster route for the monitored individual to take than their current route, instructions on how to sit or stand for better posture and health, an indication that the monitored individual is trying to lift too heavy a load, an indication that the monitored individual could walk faster if they carried a lighter load, etc.

The evaluation circuit 116 may be configured to store the sensor data received form the monitoring devices 120 and indicative of the physiological and movement characteristics of the monitored individual in the personal profile database 114 and store characteristics of the assigned task in the task profile database 112. The evaluation circuit 116 may update information in the personal profile database 114 based on the monitored physiological and movement characteristics of individuals. The evaluation circuit 116 is configured to associate the stored physiological and movement characteristics of the monitored individual with the stored characteristics of the assigned task. In some embodiments, the evaluation circuit 116 is configured to update the expected physiological and movement characteristics of an individual based on the stored data.

Figure 2:
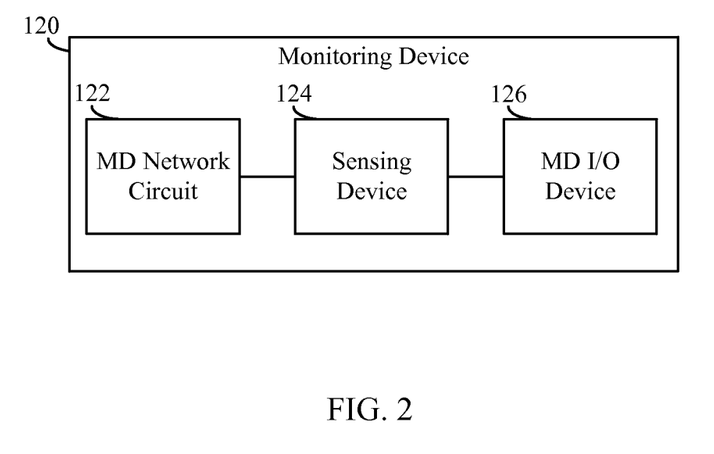
FIG. 2 is a block diagram illustrating an example embodiment of the monitoring device of FIG. 1.

Referring to FIG. 2, a block diagram illustrating an example embodiment of the monitoring device 120 of the activity monitoring system 100 of FIG. 1 is shown. The monitoring device 120 includes a monitoring device network circuit 122 enabling the monitoring device 120 to exchange data over the network 140, a sensing device 124, and a monitoring device input/output (I/O) device 126. An input aspect of the monitoring device I/O device 126 allows an individual operating the monitoring device 120 to provide information to the monitoring device 120, and may include, for example, a mechanical keyboard, a touchscreen, a microphone, a camera, a fingerprint scanner, any user input device engageable to the monitoring device 120 via a USB, serial cable, Ethernet cable, and so on. An output aspect of the monitoring device I/O device 126 allows an individual associated with the monitoring device 120 or in proximity to the monitoring device 120 to receive information from the monitoring device 120, and may include, for example, a digital display, a speaker, illuminating icons, LEDs, and so on. Further, the monitoring device I/O device 126 may be configured to include assemblies that serve both input and output functions, allowing the activity monitoring computing system 110 and the mobile display device 130 to exchange information with the monitoring device 120. Such assemblies include, for example, radio frequency transceivers (e.g., RF or NFC-based transceivers) and other short-range wireless transceivers (e.g., Bluetooth™, laser-based data transmitters, etc.).

The monitoring device 120 may include a plurality of monitoring devices 120 that are a plurality of computing systems configured to monitor at least one individual. In some embodiments, each monitoring device 120 is associated with a monitored individual. In some embodiments, a single monitoring device 120 is associated with several individuals. In some embodiments, multiple monitoring devices 120 are associated with a single individual. The monitoring devices 120 may include any type of sensing device 124 used to monitor movement of an individual or physiological characteristics of an individual. For example, the sensing device 124 may include a GPS sensor, a camera, a microphone, a motion sensor, a Lidar device, a radar device, an ultrasound device, a blood pressure sensor, a thermometer, a gyroscope, a pitot tube, a piezoelectric sensor, and so on. The sensing device 124 may be a security camera, dashboard camera, motion detector, and the like.

In some embodiments, the monitoring devices 120 are configured to be worn by an individual. For example, the monitoring devices 120 may be a watch or a clothing-embedded sensor. In some embodiments, the monitoring devices 120 may include equipment or be embedded in equipment. For example, the monitoring device 120 may include a smart hammer (e.g., a hammer with a sensing device 124 such as a gyroscope configured to sense how fast the hammer is swung), smart boots (e.g., boots with sensing device 124 such as a piezoelectric sensor configured to sense how much pressure is exerted on the soles of the boots or how many steps are taken per minute), or smart gloves (e.g., gloves containing a sensing device 124 configured to sense grip pressure or how many hand motions are performed per minute). In some embodiments, the monitoring device 120 is coupled to a piece of office equipment and configured to detect a flow of documents around an office area or how many times an individual has operated a particular piece of office equipment (e.g., how many times a particular individual has operated a printer). For example, the monitoring device 120 may be a mobile computing system, a printer, a fax machine, a file cabinet, etc. In some embodiments, the monitoring device 120 is a smartphone, a badge, an identification card, a key fob, a pedometer, a tablet, and the like. In some embodiments, monitoring devices 120 are configured to be coupled to at least one of a structure, a fixture, a piece of equipment, or a vehicle.

Figure 3:
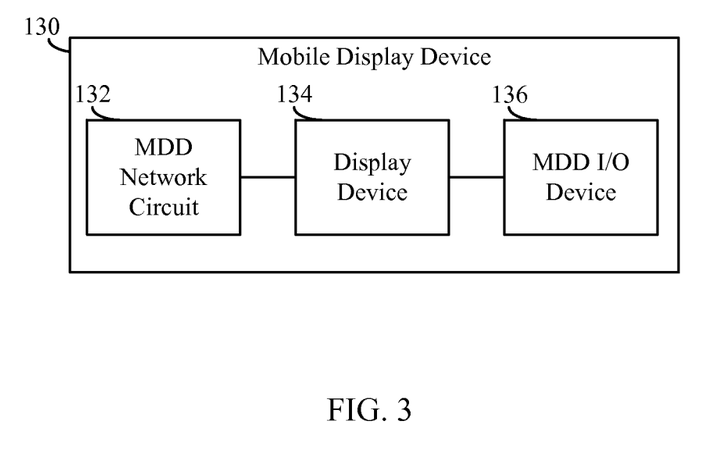
FIG. 3 is a block diagram illustrating an example embodiment of the mobile display device of FIG. 1.

Referring to FIG. 3, a block diagram illustrating an example embodiment of the mobile display device 130 of the activity monitoring system 100 of FIG. 1 is shown. The mobile display device 130 includes a mobile display device network circuit 132 enabling the mobile display device 130 to exchange data over the network 140, a display device 134, and a mobile display device I/O device 136. An input aspect of the mobile display device I/O device 136 allows an individual operating the mobile display device 130 to provide information to the mobile display device 130, and may include, for example, a mechanical keyboard, a touchscreen, a microphone, a camera, a fingerprint scanner, any user input device engageable to the mobile display device 130 via a USB, serial cable, Ethernet cable, and so on. An output aspect of the mobile display device I/O device 136 allows an individual associated with the mobile display device 130 or in proximity to the mobile display device 130 to receive information from the mobile display device 130, and may include, for example, a digital display, a speaker, illuminating icons, LEDs, and so on. Further, the mobile display device I/O device 136 may be configured to include assemblies that serve both input and output functions, allowing the activity monitoring computing system 110 and the monitoring device 120 to exchange information with the mobile display device 130. Such assemblies include, for example, radio frequency transceivers (e.g., RF or NFC-based transceivers) and other short range wireless transceivers (e.g., Bluetooth', laser-based data transmitters, etc.).

Figure 4:
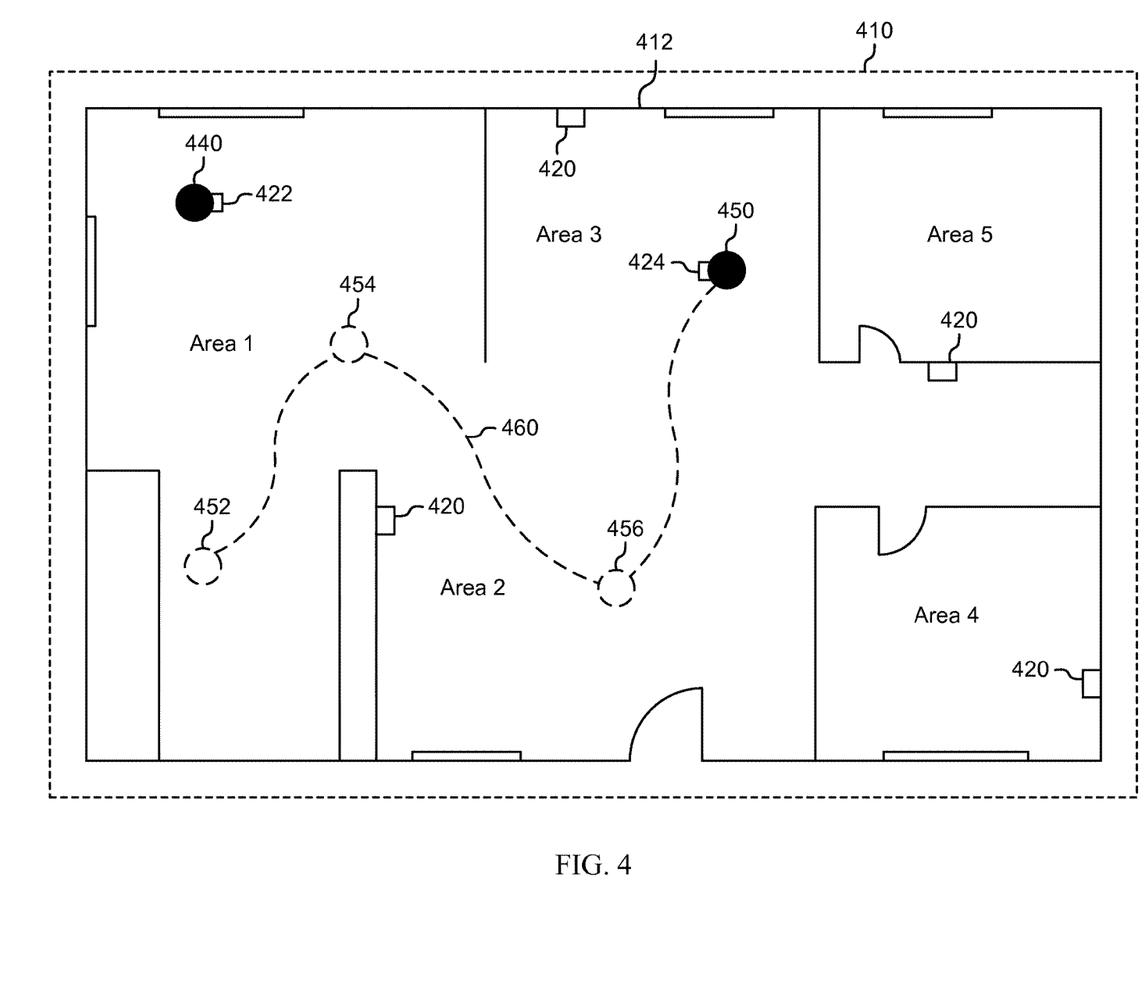
FIG. 4 is a depiction of an example embodiment of a graphical user interface shown on the display screen of the mobile display device of FIG. 3.

Referring to FIG. 4, a depiction of an example embodiment of a graphical user interface 410 shown on the display device 134 of the mobile display device 130 of FIG. 3 is shown. In some embodiments, the evaluation circuit 116 causes details (e.g., a blue print or layout) of a work area 412 to be displayed by the display device 134. The evaluation circuit 116 may also cause the display device 134 to display current locations of a first monitored individual 440 and a second monitored individual 450 including a first individual-specific monitoring device 422 worn by the first monitored individual 440 and a second individual-specific monitoring device 424 worn by the second monitored individual 450. The evaluation circuit 116 may also cause the display device 134 to display the locations of the monitoring devices 420 variously located in the work area 412. In some embodiments, different areas of the work area 412 may be labeled, partitioned from one another using symbology, or otherwise identified as component areas of the work area 412. For example, as shown in FIG. 4, the work area 412 depicts an office setting that has been divided into five sub-areas (e.g., Area 1, Area 2, Area 3, Area 4, and Area 5). In some embodiments, the work plan may require tasks to be performed in a particular area or that a particular area should not be accessed by particular individuals. Each sub-area may be associated with a range of GPS coordinates or with a particular monitoring device 220 (e.g., low energy proximity beacons that do not transmit outside of their respective sub-areas). In some embodiments, a movement history 460 of the second monitored individual 450 is tracked and stored in at least one of the task profile database 112 or the personal profile database 114 and the user's movements may be viewed by a supervisor or analyzed by the evaluation circuit 116 to determine physiological and movement information. For example, as shown in FIG. 4, the evaluation circuit 116 causes the display device 134 to display the layout of an office floor plan including the location of monitoring devices 420 and the first monitored individual 440 and the second monitored individual 450. A movement history 460 of the second monitored individual is shown as well as a plurality of previous locations 452, 454, 456 where the second monitored individual 450 stopped and performed a task. In some embodiments, the evaluation circuit 116 is configured to analyze the movement history 460 of the second monitored individual 450 to provide directions to the first monitored individual 440 or to provide the second monitored individual 450 with suggestions to improve their productivity or performance of a task (e.g., by providing an alternate route, suggesting that the individual increases their pace, etc.).

Figure 5:
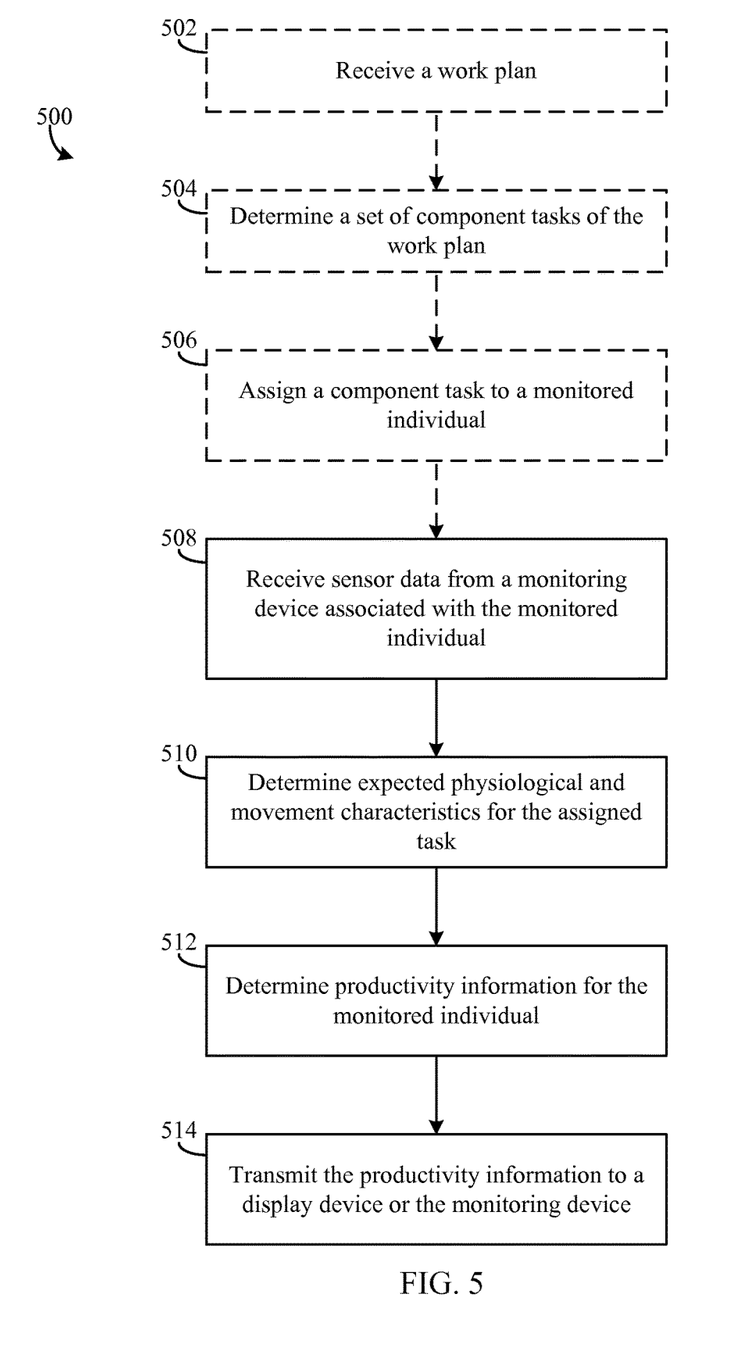
FIG. 5 is a flowchart of a method of evaluating a performance of a plurality of monitored individuals, according to an example embodiment.

Referring now to FIG. 5, a flowchart of a method 500 of evaluating a performance of a plurality of monitored individuals is shown according to an example embodiment. The method 500 may be performed by processing and storage hardware on a activity monitoring computing system (e.g., the activity monitoring computing system 110), as executed by one or more logics comprising one or more software applications configured to perform the functions described below. As shown in FIG. 5, steps 502, 504, and 506 may be optional in some embodiments of the method 500.

At step 502, the activity monitoring computing system 110 receives a work plan. In some embodiments, the activity monitoring computing system 110 receives, by the evaluation circuit 116 over the network 140 via the network circuit 118, a work plan including parameters of a project to be completed. In some embodiments, the work site plan includes a map or blueprint of the work site. In some embodiments, the work site plan includes performance guidelines and proposed timelines for various stages of the product or project to be completed.

At step 504, the activity monitoring computing system 110 determines a set of component tasks of the work plan. In some embodiments, the activity monitoring computing system 110 determines, by the evaluation circuit 116, a set of component tasks of the project to be completed based on the parameters and the task information. For example, the evaluation circuit 116 may be configured to create a set of tasks capable of being carried out by a monitored individual or group of monitored individuals based on parameter of the work plan.

At step 506, the activity monitoring computing system 110 assigns a component task to a monitored individual. In some embodiments, the activity monitoring computing system 110 assigns, by the evaluation circuit 116, each component task of the set of component tasks to a monitored individual of the plurality of monitored individuals. The evaluation circuit 116 may assign each component task of the set of component tasks to an individual based on a characteristic of the individual and a parameter of the project to be completed. For example, the evaluation circuit 116 may assign a task of carrying a heavy load to an individual with a work history of successfully carrying loads having a weight above a threshold weight. In some embodiments, the evaluation circuit 116 assigns a particular task to an individual based on the individual having an evaluation score or an efficiency score above a threshold.

At step 508, the activity monitoring computing system 110 receives sensor data from a monitoring device associated with the monitored individual. In some embodiments, the activity monitoring computing system 110 receives, by the evaluation circuit 116 over the network 140 via the network circuit 118, sensor data from a plurality of monitoring devices 120 indicative of physiological and movement characteristics of a plurality of monitored individuals each performing an assigned task. The physiological characteristics can be any type of monitored mechanical, physical, and biochemical functions of an individual or the individual's organs. The movement characteristics can be at least one of a body motion direction, a body motion speed, a movement within an area associated with the work plan, and a location of the monitored individual during performance of the assigned task.

At step 510, the activity monitoring computing system 110 determines expected physiological and movement characteristics for the assigned task. In some embodiments, the activity monitoring computing system 110 determines, by the evaluation circuit 116, expected physiological and movement characteristics for each of the assigned tasks based on a comparison of an assigned task and task information stored in the task profile database 112. In some embodiments, the task profile database 112 stores task information for a plurality of tasks previously completed. In some embodiments, the task information is indicative of characteristics of each task previously completed and physiological and movement characteristics of an individual during performance of each completed task.

At step 512, the activity monitoring computing system 110 determines productivity information for the monitored individual. In some embodiments, the activity monitoring computing system 110 determines, by the evaluation circuit 116, for each of the monitored individuals, productivity information based on a comparison of the physiological and movement characteristics of the monitored individual and expected physiological and movement characteristics associated with the task assigned to the monitored individual. The evaluation circuit 116 may identify inefficiencies based on comparing the actual movement characteristics of the individual when performing the task with expected or forecasted movement characteristics.

At step 514, the activity monitoring computing system 110 transmits the productivity information to a display device or the monitoring device. In some embodiments, the activity monitoring computing system 110 transmits, by the evaluation circuit 116 over the network 140 via the network circuit 118, the productivity information to at least one of a display device 130 and at least one of the monitoring devices 120. In some embodiments, transmitting the productivity information includes causing the display device 130 and at least one of the monitoring devices 120 to display a location of at least one of the monitored individuals.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. §112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. An activity monitoring computing system, comprising:
   a network circuit enabling the activity monitoring computing system to exchange information over a network with a monitoring device;
   a task profile database storing task information for a plurality of tasks previously completed, wherein the task information is indicative of characteristics of each task previously completed and physiological and movement characteristics of an individual during performance of each completed task; and
   an evaluation circuit configured to:
      receive, over the network via the network circuit, sensor data from the monitoring device indicative of physiological and movement characteristics of a monitored individual during performance of an assigned task;
      determine expected physiological and movement characteristics for the assigned task based on a comparison of the assigned task and the task information stored in the task profile database;
      determine productivity information based on a comparison of the physiological and movement characteristics of the monitored individual and the expected physiological and movement characteristics associated with the assigned task; and
      transmit, over the network via the network circuit, the productivity information to at least one of a display device and the monitoring device.

2. The activity monitoring computing system of claim 1, wherein the evaluation circuit is further configured to determine the expected physiological and movement characteristics for the assigned task based on a profile of the monitored individual, and wherein the profile of the monitored individual includes data indicative of at least one of identification information, role or job title, a list of capabilities or certifications, medical information, and physical capabilities of the monitored individual.

3. The activity monitoring computing system of claim 1, wherein the monitoring device is a first monitoring device of a plurality of monitoring devices, wherein the monitored individual is a first monitored individual of a plurality of monitored individuals, and wherein the evaluation circuit is further configured to:
   receive a work plan including parameters of a project to be completed;
   determine a set of component tasks of the project to be completed based on the parameters and the task information; and
   assign each component task of the set of component tasks to a monitored individual of the plurality of monitored individuals.

4. The activity monitoring computing system of claim 3, wherein each monitoring device is associated with at least one monitored individual.

5. The activity monitoring computing system of claim 3, wherein the work plan includes a map or blueprint of a work site, and wherein transmitting the productivity information includes causing the at least one of the display device and the monitoring device to display a location of the monitored individual.

6. The activity monitoring computing system of claim 3, wherein at least one of the monitoring devices is configured to be worn by one of the monitored individuals.

7. The activity monitoring computing system of claim 3, wherein at least one of the monitoring devices is configured to be coupled to at least one of a structure, a vehicle, and a piece of equipment.

8. The activity monitoring computing system of claim 1, wherein the movement characteristics include at least one of a body motion direction, a body motion speed, a movement around an area associated with the work plan, and a location of the monitored individual during performance of the assigned task; and
   wherein the physiological characteristics include at least one of a voice level, a voice pitch, a stress level, a pulse, a breathing rate, a perspiration rate, a blood pressure, and a body temperature of the monitored individual during performance of the assigned task.

9. The activity monitoring computing system of claim 1, wherein the evaluation circuit is further configured to:
   store the physiological and movement characteristics of the monitored individual in a personal profile database;
   store characteristics of the assigned task in the task profile database; and
   associate the stored physiological and movement characteristics of the monitored individual with the stored characteristics of the assigned task.

10. The activity monitoring computing system of claim 1, wherein the evaluation circuit is further configured to transmit a performance alert to the monitoring device over the network via the network circuit, and wherein the performance alert is at least one of an audio, visual, or haptic alert.

11. The activity monitoring computing system of claim 1, wherein the evaluation circuit is further configured to identify an inefficiency based on comparing the movement characteristics of the monitored individual when performing the assigned task with an expected movement characteristic.

12. A method of evaluating a performance of a plurality of monitored individuals by an activity monitoring computing system, the method comprising:
   receiving, by an evaluation circuit, a work plan including parameters of a project to be completed;
   determining, by the evaluation circuit, a set of component tasks of the project to be completed based on the parameters and task information;
   assigning, by the evaluation circuit, each component task of the set of component tasks to a monitored individual of a plurality of monitored individuals;
   receiving, by the evaluation circuit over a network via a network circuit, sensor data from a plurality of monitoring devices indicative of physiological and movement characteristics of a plurality of monitored individuals each performing an assigned task;
   determining, by the evaluation circuit, for each of the monitored individuals, productivity information based on a comparison of the physiological and movement characteristics of the monitored individual and expected physiological and movement characteristics associated with the assigned task of the monitored individual; and
   transmitting, by the evaluation circuit over the network via the network circuit, the productivity information to at least one of a display device and at least one of the monitoring devices;
   wherein the work plan includes a map or blueprint of a work site, and wherein transmitting the productivity information includes causing the at least one of the display device and the at least one of the monitoring devices to display a location of at least one of the monitored individuals.

13. The method of claim 12, further comprising:
determining, by the evaluation circuit, the expected physiological and movement characteristics for each of the assigned tasks based on a comparison of an assigned task and the task information, the task information stored in a task profile database, wherein the task profile database stores task information for a plurality of tasks previously completed, and wherein the task information is indicative of characteristics of each task previously completed and physiological and movement characteristics of an individual during performance of each completed task.

14. The method of claim 12, wherein at least one of the monitoring devices is configured to be worn by one of the monitored individuals, and wherein at least one of the monitoring devices is configured to be coupled to at least one of a structure, a vehicle, and a piece of equipment.

15. The method of claim 12, further comprising transmitting a performance alert to at least one of the monitoring devices over the network via the network circuit, wherein the performance alert is at least one of an audio, visual, or haptic alert.

16. The method of claim 12, further comprising:
determining, by the evaluation circuit, an inefficiency based on comparing the movement characteristics of the monitored individual when performing the assigned task with an expected movement characteristic.

17. The method of claim 16, further comprising:
generating, by the evaluation circuit, a suggested route for the monitored individual to travel within the work site based on a layout of the work site and an environmental condition.

18. A non-transitory computer readable media having computer-executable instructions embodied therein that, when executed by an evaluation circuit of an activity monitoring computing system, causes the activity monitoring computing system to perform operations to evaluate a performance of a plurality of monitored individuals, the operations comprising:
receiving a work plan including parameters of a project to be completed;
determining a set of component tasks of the project to be completed based on the parameters and task information;
assigning each component task of the set of component tasks to a monitored individual of the plurality of monitored individuals;
receiving, over a network via a network circuit, sensor data from a plurality of monitoring devices indicative of physiological and movement characteristics of a plurality of monitored individuals each performing an assigned task;
determining for each of the monitored individuals, productivity information based on a comparison of the physiological and movement characteristics of the monitored individual and expected physiological and movement characteristics associated with the assigned task of the monitored individual; and
transmitting the productivity information to at least one of a display device and at least one of the monitoring devices over the network via the network circuit;
wherein the work plan includes a map or blueprint of a work site, and wherein transmitting the productivity information includes causing the at least one of the display device and the at least one of the monitoring devices to display a location of at least one of the monitored individuals.

19. The non-transitory computer readable media of claim 18, wherein the computer-executable instructions, when executed by the evaluation circuit, further cause the activity monitoring computing system to perform operations comprising:
determining the expected physiological and movement characteristics for each of the assigned tasks based on a comparison of an assigned task and the task information, the task information stored in a task profile database, wherein the task profile database stores task information for a plurality of tasks previously completed, and wherein the task information is indicative of characteristics of each task previously completed and physiological and movement characteristics of an individual during performance of each completed task.

20. The non-transitory computer readable media of claim 18, wherein the computer-executable instructions, when executed by the evaluation circuit, further cause the activity monitoring computing system to perform operations comprising:
storing the physiological and movement characteristics of the monitored individual in a personal profile database;
storing characteristics of the assigned task in the task profile database; and
associating the stored physiological and movement characteristics of the monitored individual with the stored characteristics of the assigned task.

* * * * *